United States Patent
Garrido et al.

(10) Patent No.: US 10,277,829 B1
(45) Date of Patent: Apr. 30, 2019

(54) VIDEO CAPTURE IN LOW-LIGHT CONDITIONS

(71) Applicant: Apple Inc., Cupertino, CA (US)

(72) Inventors: Christopher M. Garrido, Cupertino, CA (US); David L. Biderman, Cupertino, CA (US); Eric L. Chien, Cupertino, CA (US); Gurtej Singh G. Chandok, Cupertino, CA (US); Kartik P. Sathappan, San Francisco, CA (US); Komei Harada, Cupertino, CA (US); Ming Jin, Cupertino, CA (US); Patrick Miauton, Cupertino, CA (US); Wenhui Xu, Cupertino, CA (US); Xiaoxiao Zheng, Cupertino, CA (US); Yichao Shen, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/675,451

(22) Filed: Aug. 11, 2017

Related U.S. Application Data

(60) Provisional application No. 62/374,500, filed on Aug. 12, 2016.

(51) Int. Cl.
| | |
|---|---|
| H04N 7/14 | (2006.01) |
| G03B 17/00 | (2006.01) |
| H04N 5/235 | (2006.01) |
| H04N 5/238 | (2006.01) |
| H04N 5/243 | (2006.01) |

(52) U.S. Cl.
CPC ........... *H04N 5/238* (2013.01); *H04N 5/2351* (2013.01); *H04N 5/243* (2013.01); *G03B 17/00* (2013.01); *H04N 2007/145* (2013.01)

(58) Field of Classification Search
CPC combination set(s) only.
See application file for complete search history.

(56) References Cited

U.S. PATENT DOCUMENTS

| | | | |
|---|---|---|---|
| 7,663,691 B2 | 2/2010 | Ciudad | |
| 8,340,365 B2 | 12/2012 | Thorn | |
| 8,797,411 B2 | 8/2014 | Corley | |
| 2003/0079224 A1* | 4/2003 | Komar | ............... H04N 5/44591 725/32 |
| 2003/0090455 A1 | 5/2003 | Daly | |
| 2004/0119873 A1 | 6/2004 | Ong | |

(Continued)

*Primary Examiner* — Phung-Hoang J Nguyen
(74) *Attorney, Agent, or Firm* — Blank Rome LLP

(57) ABSTRACT

In scenes that have low lighting, it may be difficult for a personal electronic device to capture video images that meet a scene lighting criteria. In some low-lighting situations, the receiving party may be unable to sufficiently see the face of the party that they are videoconferencing with. Described herein are techniques for utilizing a device's display to illuminate the scene surrounding the device. Improved lighting may come from global display adjustments, local display adjustments that do not alter the display's contents (other than to change their brightness levels), and/or local display adjustments that alter the display's contents. In some embodiments, background elements on a device's display may be identified for brightening in a first attempt to meet the scene lighting criteria without negatively impacting foreground scene content. If such approaches are unsuccessful, the device may next replace one or more regions of displayed content with regions of brightened pixels.

17 Claims, 11 Drawing Sheets

(56) References Cited

U.S. PATENT DOCUMENTS

| | | |
|---|---|---|
| 2006/0071936 A1 | 4/2006 | Leyvi |
| 2007/0081094 A1 | 4/2007 | Ciudad |
| 2007/0176870 A1 | 8/2007 | Hung |
| 2009/0160945 A1 | 6/2009 | Chung |
| 2009/0231440 A1 | 9/2009 | Lai |
| 2009/0268049 A1* | 10/2009 | Kim .................. G11B 27/038 348/222.1 |
| 2009/0273661 A1 | 11/2009 | Mauchly |
| 2009/0322889 A1 | 12/2009 | Kujawa |
| 2010/0182446 A1 | 7/2010 | Matsubayashi |
| 2010/0194961 A1 | 8/2010 | Patel |
| 2010/0289930 A1 | 11/2010 | Liao |
| 2011/0109749 A1* | 5/2011 | Chanas .................. H04N 5/232 348/164 |
| 2011/0115833 A1 | 5/2011 | Shimoyama |
| 2011/0117959 A1 | 5/2011 | Rolston |
| 2012/0069221 A1* | 3/2012 | Imai ........................ G09G 3/20 348/238 |
| 2012/0154662 A1* | 6/2012 | Yang ...................... H04N 5/225 348/333.02 |
| 2013/0027581 A1 | 1/2013 | Price |
| 2013/0044249 A1 | 2/2013 | Ledbetter |
| 2013/0050233 A1 | 2/2013 | Hirsch |
| 2014/0104436 A1 | 4/2014 | Bork |
| 2014/0225980 A1 | 8/2014 | Patel |
| 2015/0002735 A1 | 1/2015 | Moskovchenko |
| 2015/0189138 A1 | 7/2015 | Xie |
| 2015/0243200 A1 | 8/2015 | Pan |
| 2016/0225301 A1 | 8/2016 | Scepanovic |
| 2016/0269652 A1* | 9/2016 | Fukuya ................ H04N 5/2621 |
| 2017/0124717 A1* | 5/2017 | Baruch .................. G06T 7/187 |

\* cited by examiner

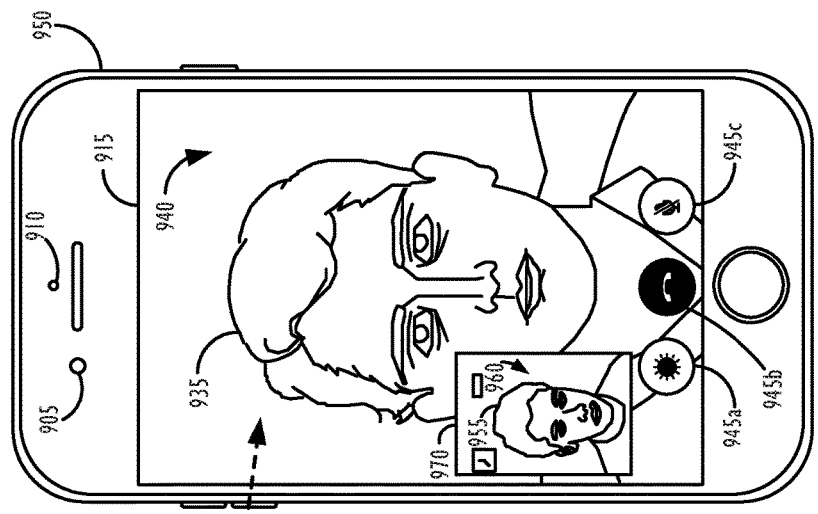
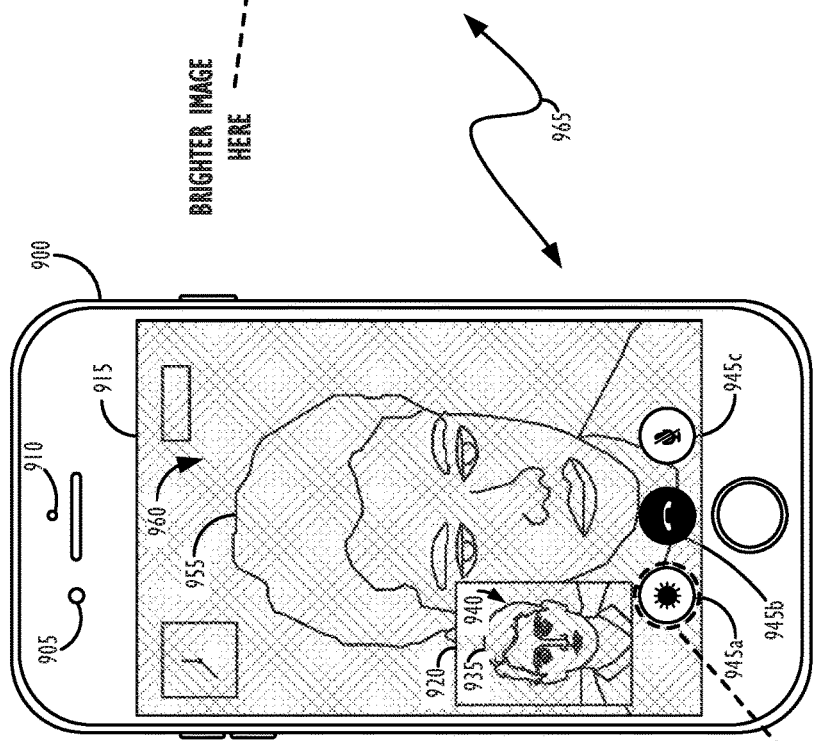

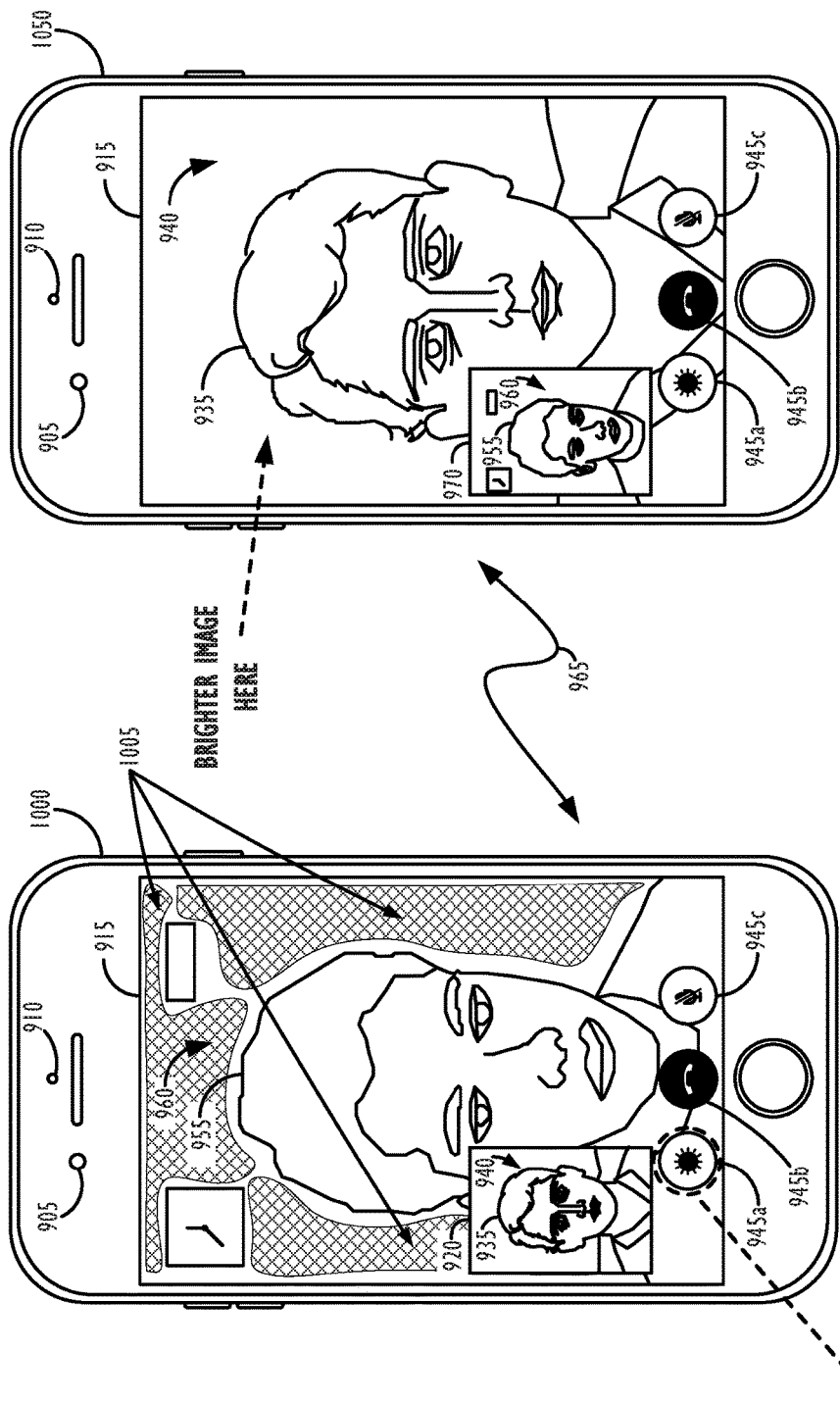

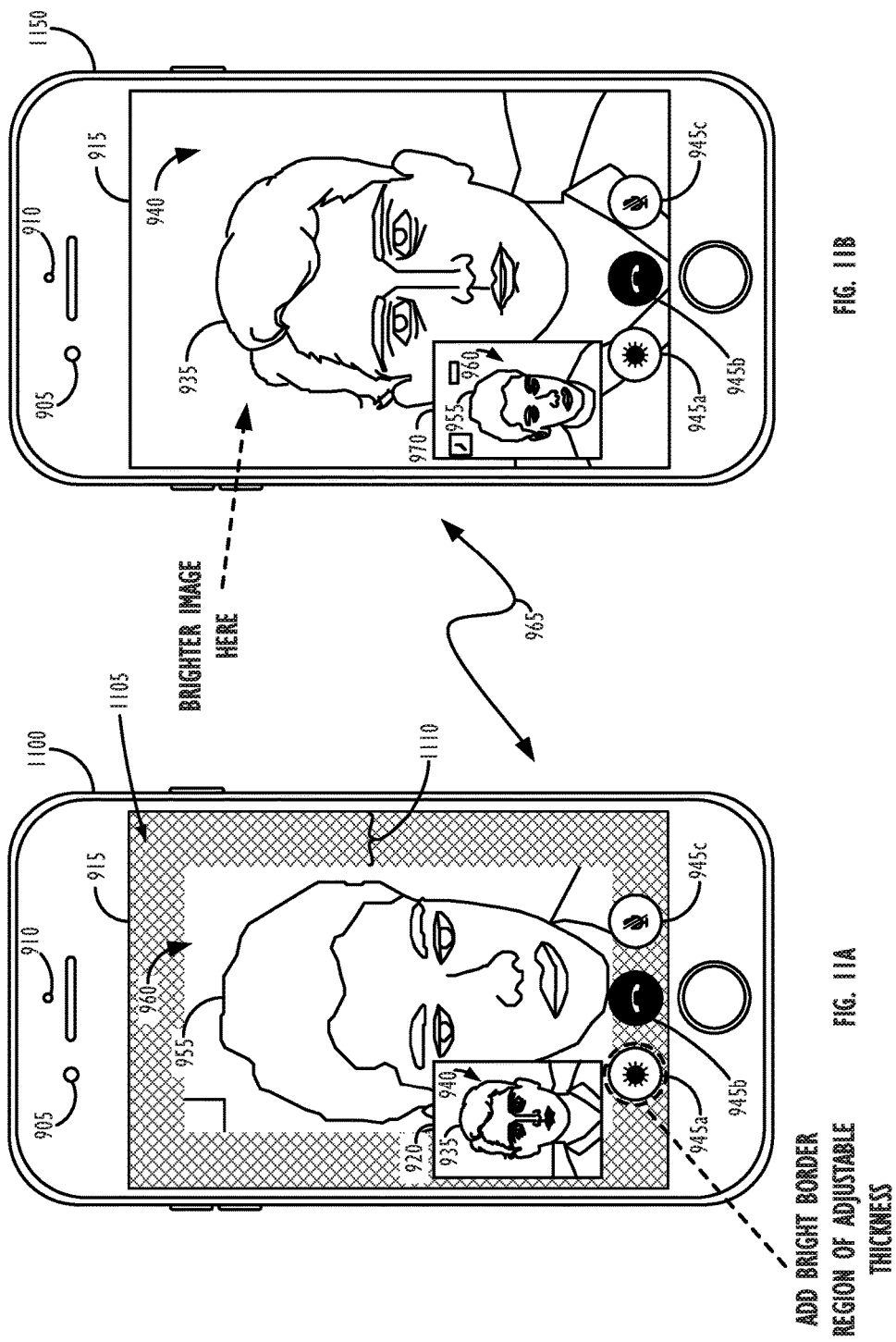

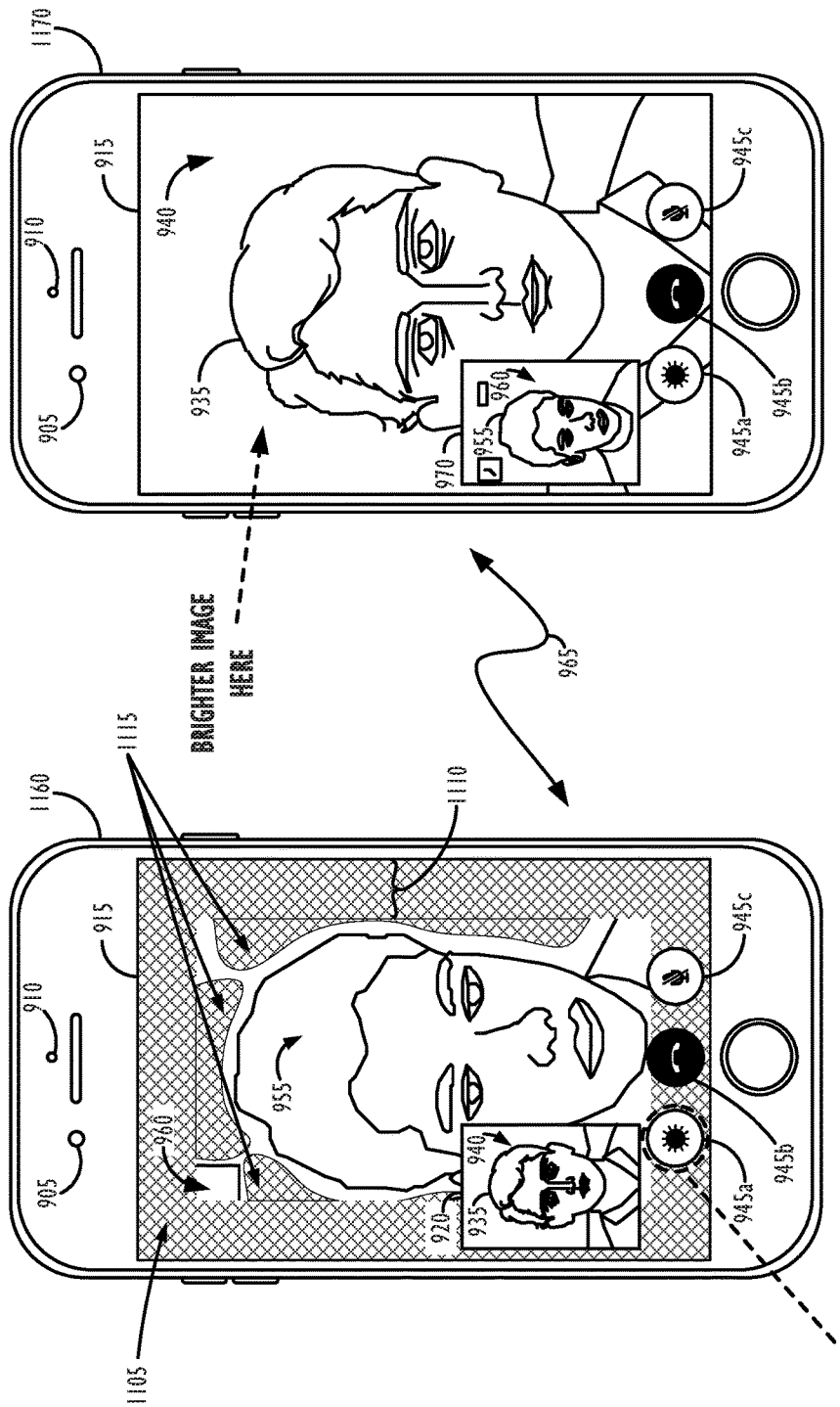

VIDEO CAPTURE IN LOW-LIGHT CONDITIONS

CROSS-REFERENCE TO RELATED APPLICATION

This application claims priority to U.S. Provisional Application Ser. No. 62/374,500, entitled, "Video Capture in Low-Light Conditions," and filed Aug. 12, 2016 ("the '500 application"). The '500 application is also hereby incorporated by reference in its entirety.

TECHNICAL FIELD

This disclosure relates generally to the field of video capture and, more particularly, to improved video capture in low-light conditions.

BACKGROUND

Many personal electronic devices come equipped with, or otherwise utilize, digital cameras that may be used to capture images or videos, which in turn may be used in videoconferencing applications or the like. Typically, it is desirable to maintain the brightness of the captured video frames within a predetermined range to help prevent the video frames from being underexposed or overexposed. To that end, some digital cameras may utilize an auto exposure system (also referred herein as an "AE system"), which may be configured to modify one or more system settings to control the exposure of the captured images. For example, the AE system may utilize one or more algorithms to evaluate the brightness of some or all of the scene being captured and modifying one or more hardware settings (e.g., exposure time, aperture size, gain) and/or image processing techniques to maintain the brightness of captured images (or one or more portions thereof) within a predetermined range.

AE systems may have limits on the range of the exposure adjustments they can make, and thus may not always be able to capture images within the predetermined range, such as during low-light conditions when the surrounding environment may provide little or no light to the scene being captured. This may be problematic when capturing video using a mobile device, as the lighting conditions may change drastically as a user moves between different lighting conditions, and especially so when the camera does not have an associated flash element to help illuminate the screen. Thus, there is a need for systems, methods, and computer-readable media to provide for well-lit images, even under low-light conditions.

SUMMARY

AE systems in personal electronic devices with image capture capabilities are often exposed to a wide variety of rapidly changing lighting and scene conditions, and thus face the difficult task of attempting to sufficiently expose the images being captured. However, in some lighting conditions faced by mobile personal electronic devices, there is simply not enough light present for the device's AE system to adjust the exposure system's setting values sufficiently to make the captured video stream (which may, e.g., contain a representation of the user of the device's face) bright enough to be visibly discernible in the captured video stream. In the case of a video stream that is sent to a recipient, such as in the case of videoconferencing, this may result in poor quality video streams over a large number of frames.

Accordingly, described herein are various techniques to improve video capture for use in low-light conditions, e.g., as applied to handheld and/or mobile videoconferencing applications executing on personal electronic devices.

In one embodiment, a mobile personal electronic device may comprise a digital camera (or other image capture device) and a display screen, e.g., for display content to a user of the device. In some embodiments, the digital camera and display screen may be contained in the same housing (e.g., in the case of a mobile phone having one or more digital cameras and a display screen). In other embodiments, however, the digital camera and display screen may be separate components of the device (e.g., in the case of a computer having one or more digital cameras attached to it and a monitor or other display screen). According to some such embodiments, the device may possess a "low-lighting" mode that is either manually activatable by a user of the device or automatically activated in response to detected low scene lighting conditions. Further according to some such embodiments, activating the low lighting mode may comprise brightening one or more aspects of the display of the device that is in the low scene lighting conditions (e.g., incrementally or in a single adjustment), thus providing a greater amount of ambient lighting in the proximity of the device that is in the low scene lighting conditions.

Generally, the brightening of one or more aspects of the display of the device that is in the low scene lighting conditions may comprise one or more of the following types of adjustments: 1.) global adjustments (i.e., increasing the brightness of all of the pixels on the display of the device, except for any pixels that are already at max brightness); 2.) local adjustments (i.e., selectively increase the brightness of a subset of pixels on the display of the device); or 3.) a combination of global and local adjustments (i.e., increasing the brightness of all pixels on the display of the device by some first amount and then selectively increasing the brightness of a subset of pixels in the display of the device by some additional second amount).

Within the category of local adjustments to brighten one or more aspects of the display of the device, certain adjustments may not alter display content (i.e., the display will output the same image when the low-lighting mode is active as it would were the low-lighting mode not active, with the exception of changes in pixel brightness), while other adjustments will alter display content (i.e., the display will output a different image when the low-lighting mode is active than it would were the low-lighting mode not active, wherein the differences go beyond mere pixel brightness changes). For example, the aspect ratio of the image may be reduced to allow for the placement of one or more border regions of bright pixels on the device display, as will be discussed in further detail below. In other instances, one or more pixels on the device display may be changed to a different color, which may occur in instances such as when one or more portions of the display of the device are replaced by a border region of bright pixels, thus causing the original display image to be cropped.

In embodiments where one or more portions of the display of the device that is in the low scene lighting conditions are replaced by a region of bright white (or any other desired color) pixels, a greater amount of ambient lighting may be provided in the proximity of the display of the device that is in low scene lighting conditions, which may, e.g., brighten the face of a user utilizing the device to capture image frames of himself or herself. As mentioned above, in some embodiments, the one or more portions may comprise a border region (i.e., a contiguous region of pixels within the image that touches at least one edge of the display) of adjustable thickness around the outer edges of the display of the device that is in the low scene lighting conditions. In other embodiments, the one or more portions may comprise other regions (e.g., non-border regions, i.e., regions of pixels that do not touch at least one edge of the display) of the display of the device that is in the low scene lighting conditions. In still other embodiments, the one or more portions may comprise regions in the currently-displayed image (i.e., an image that may comprise an image of a recipient videoconferee in his or her present environment) that could be brightened without significantly affecting the overall quality of the video experience on the device in the low scene lighting conditions (e.g., parts of the background and/or walls in the recipient videoconferee's present environment).

As mentioned above, according to some embodiments, the low lighting mode may be activated in response to detected low scene lighting conditions. According to some such embodiments, scene lighting conditions may be detected using one or more sensors on the personal electronic device (e.g., one or more cameras, or one or more ambient light sensors). If such sensors do not record a threshold level of ambient lighting, the current scene may be determined to be a candidate for low lighting mode, and the techniques described herein to improve illumination of the scene surrounding a device in low lighting conditions may be activated, either automatically or based on user input. In other embodiments, e.g., embodiments wherein the personal electronic device possesses one or more sensors and an AE system, the device's built-in AE system may be utilized to determine that a low scene lighting condition exists. For example, if one or more parameters of the device's AE system meets a predetermined condition or set of conditions in an attempt to meet the scene brightness target, the device may determine such scene to be a candidate for low lighting mode.

In the context of handheld videoconferencing applications, the user is generally able to keep the camera pointed at the subject of interest (i.e., usually himself or herself), such that the face of the subject of interest is almost always centered in the image frame. Thus, according to still other embodiments, face detection/tracking parameters may be utilized as an indication of whether or not a device is experiencing low scene lighting conditions. In particular, if the confidence value associated with a face detection bounding box is below a certain threshold value, it may indicate that there are low scene lighting conditions. The same may be true if a face tracking parameter drops below a certain threshold value. This face detection/tracking information may be used alone and/or in conjunction with the other low scene lighting detection methods outlined above (e.g., ambient light sensor measurements, AE system settings, etc.) in order for a device to determine that it is presently in low scene lighting conditions.

Because of the favorable results achieved by the embodiments disclosed herein, the low-light video capture improvement techniques described below are readily applicable to any number of handheld and/or personal electronic devices possessing digital video cameras, e.g., mobile phones, personal data assistants (PDAs), portable music players, or laptop/tablet computers. Alternatively, the techniques for low lighting conditions described below may also be implemented in conventional cameras or traditional, fixed camera videoconferencing applications having display screens.

The techniques described herein may be used in any desired combination and/or sequence with one another to provide the optimal lighting improvement for a given situation. The techniques for scene illumination described herein may also be applied in a hierarchical fashion, with certain categories of scene illumination techniques applied preferentially, and other categories of scene illumination techniques applied when the preferred techniques are not able to brighten the scene to a sufficient level, e.g., to meet a scene lighting criteria. For example, in some embodiments, local adjustments to brighten one or more aspects of the display of the device without altering display content composition (e.g., by changing pixel brightness values only in identified background elements of displayed image, but not removing or resizing any portions of the displayed image) may be implemented in a gradually increasing fashion as a first step in an attempt to improve scene lighting conditions. Then, if a maximum non-content altering local adjustment amount is reached (e.g., via the aforementioned brightening of one or more identified background elements to a maximum permitted extent) and the scene still needs further lighting improvements to meet the scene lighting criteria, local adjustments that do alter display content composition (e.g., by reducing the dimension of the display image and placing one or more regions of bright pixels on the device display in the portions of the device display that are no longer displaying the display image after the dimensional reduction) may be implemented, i.e., in addition to the local non-display content composition altering brightening that has already been applied to the device display.

The techniques described herein may also be implemented adaptively, in that, they can adapt to changing conditions and compositions of the scene being captured at the device as the capturing continues. As scene lighting conditions improve, for example, the amount of additional illumination provided by one or more of the employed scene illumination techniques may be scaled down as needed, e.g., to maintain a target average brightness value in the video images being captured by the device. Further embodiments include methods and program storage devices containing instructions to implement the techniques described herein to improve video capture in low-light conditions.

BRIEF DESCRIPTION OF THE DRAWINGS

FIGS. 9A and 9B illustrate exemplary mobile personal electronic devices utilizing a low lighting conditions mode implementing global adjustment techniques, in accordance with some embodiments.

FIGS. 10A and 10B illustrate exemplary mobile personal electronic devices utilizing a low lighting conditions mode implementing local adjustment techniques that do not alter display content, in accordance with other embodiments.

FIGS. 11A and 11B illustrate exemplary mobile personal electronic devices utilizing a low lighting conditions mode implementing local adjustment techniques that alter display content, in accordance with still other embodiments.

FIGS. 11C and 11D illustrate exemplary mobile personal electronic devices utilizing a low lighting conditions mode implementing multiple local adjustment techniques concurrently, in accordance with still other embodiments.

DESCRIPTION

Systems, methods, and program storage devices are disclosed, which intelligently and dynamically utilize a display screen associated with a camera to illuminate the scene surrounding the device in such a way as to lead to well-lit images being captured by the camera, e.g., images that meet a scene lighting criteria. The images captured by the camera may, e.g., be encoded and stored or transmitted to a recipient device. The techniques disclosed herein are applicable to any number of electronic devices with displays: such as digital cameras, digital video cameras, mobile phones, personal data assistants (PDAs), portable music players, monitors, and, of course, desktop, laptop, and tablet computer displays.

In the following description, for purposes of explanation, numerous specific details are set forth in order to provide a thorough understanding of the inventive concept. As part of this description, some of this disclosure's drawings represent structures and devices in block diagram form in order to avoid obscuring the invention. In the interest of clarity, not all features of an actual implementation are described in this specification. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one implementation of the invention, and multiple references to "one embodiment" or "an embodiment" should not be understood as necessarily all referring to the same embodiment.

Figure 1:
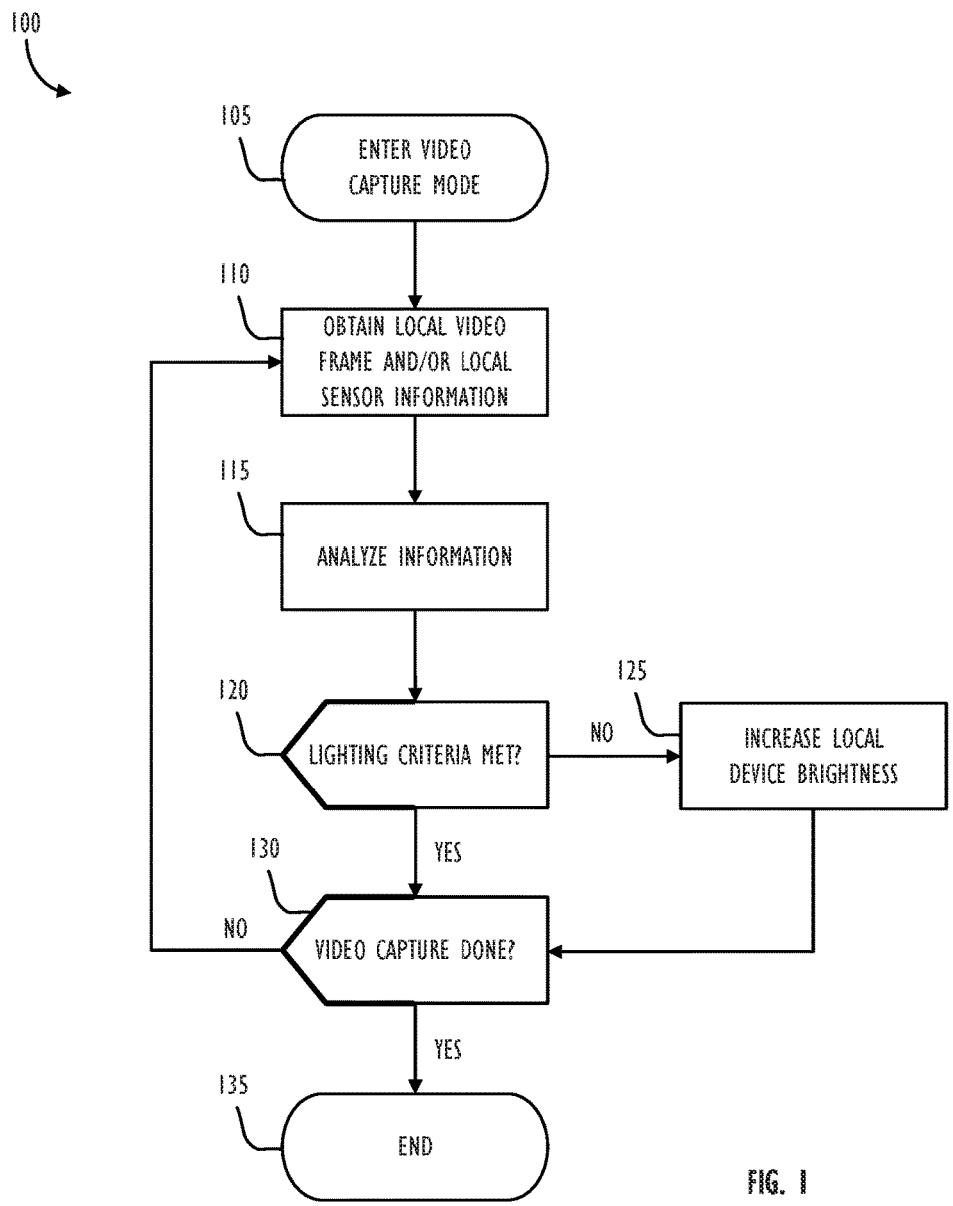
FIG. 1 is a flowchart illustrating a method of improving video capture in low lighting conditions, in accordance with some embodiments.

Referring now to FIG. 1, a flowchart 100 illustrating a method of improving video capture in low lighting conditions is shown, in accordance with some embodiments. First, the video capture device may enter into a video capture mode (Step 105). In some embodiments, the video capture mode may be part of a video conferencing mode that operates, e.g., by establishing a communications link with a recipient device over Wi-Fi, 3G, LTE, LTE-Advanced, or the like. In some such embodiments, the videoconferencing mode may comprise an application executing on the mobile device that is configured to encode and transmit video images to the recipient device while simultaneously receiving, decoding, and displaying concurrent video images sent from the recipient device. Additionally, a synchronized audio stream may be encoded and transmitted/received along with (or as part of) the corresponding video stream.

Next, at Step 110, the device may obtain (and display) a local video frame (i.e., a video frame captured by the device executing method 100 and thus reflective of the lighting conditions in the local environment of the device) and/or local sensor information. At Step 115, the process may then analyze the information gathered from the local device's captured video frames and/or the local device's sensors. The image analysis performed at Step 115 may, e.g., analyze various image frame information (e.g., average luminance, image histogram data, white point, face detection information, etc.), light level information from sensors, and/or AE system settings. In some embodiments, one or more of the image frame information types enumerated above may be used in combination and/or in sequence with one or more of the other image frame information types. For example, a combination of image average luminance and face detection information may be used to determine if there is sufficient light in a given image frame to meet a scene lighting criteria. In other examples, information from one or more device sensors may be combined to determine an overall brightness level in the environment of the device.

In some embodiments, one or more of the image frame information types enumerated above may be monitored over time. For example, one technique may be to determine an average luminance value of the captured image frames over some time period, t. If the average luminance does not exceed a predetermined threshold value, $T_{hresh}$, over the time period, t, then the device may determine itself to be in low lighting conditions. According to some embodiments, the average luminance of the captured images may be measured over the time period, t, to see if the camera's AE system is capable of adjusting the camera's exposure setting values enough over time to produce a sufficiently bright image, e.g., by increasing the exposure time of the camera being used to capture the video frames over time. Also, lighting conditions around a user of the device may be changing rapidly, so there may be no need to engage the low light conditions mode if the device is only in low lighting conditions for a very short amount of time (e.g., someone has flicked a light switch off and then back on a moment later). In some instances, e.g., low-lighting conditions, however, the AE system will not be able to adjust the camera's exposure parameters enough to produce sufficiently bright photos (e.g., images that meet selected scene lighting criteria)—even when the parameters are set to their maximum allowable values.

As mentioned above, the analysis process may take the form of an average luminance assessment of the incoming video frames, e.g., over a time period, t. In other embodiments, the process may use a median luminance, center-weighted mean luminance, center-weighted median luminance, or other desired technique to determine a scene brightness level. In still other embodiments, image histograms may be created for the incoming captured video frames, and the histograms may be analyzed to determine if a threshold amount of brightness is present in the incoming captured video frames.

Step 115 may also utilize information from other local sensors, e.g., ambient light sensors, to make a direct assessment of the brightness level of the environment surrounding the device. In some embodiments, if a device has more than one ambient light sensor, the ambient light sensor more directly measuring the light levels in the proximity of the user of the device's face may be used (or, at least, more heavily weighted) in making the assessment of the brightness level in the environment of the device.

At Step 120, based on the analysis performed at Step 115, the determination will be made as to whether a scene lighting criteria has been met. As mentioned above, this determination may comprise comparing a measured brightness value against a predetermined or dynamic threshold brightness value. In other embodiments, multiple parameters indicative of scene brightness may be used in determining whether a scene lighting criteria has been met (e.g., when any one parameter crosses a respective threshold, when at least some or all such parameters have crossed their respective thresholds, or based on a weighted combination of the parameters, etc.). If, at Step 120, it is determined that the scene lighting criteria has been met, the process may proceed to Step 130, wherein the device determines if the video capture operation is done. If, instead, at Step 120, it is determined that the scene lighting criteria has not been met, the process may proceed to Step 125, wherein various techniques may be employed to increase the brightness levels in the environment of the local device, as are discussed in greater detail here. Once local device brightness levels have been increased such that the scene lighting criteria has been met, the process may proceed to Step 130, wherein the device determines if the video capture operation is done. If it is not done, the process may return to Step 110, where it may continue obtaining local video frame and/or local sensor information. If the device is done with the videoconferencing mode, the process may proceed to Step 135 and end the video capture mode.

Figure 2:
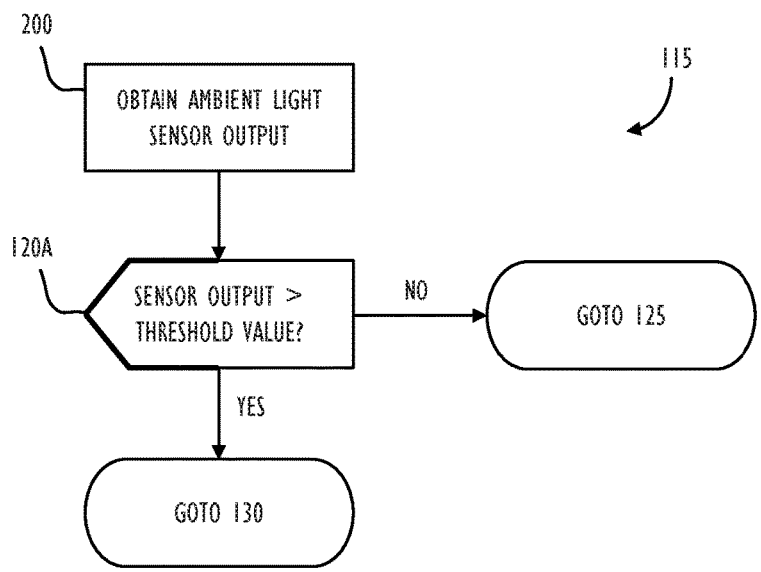
FIG. 2 is a flowchart illustrating a method of determining whether a scene lighting criteria has been met, in accordance with some embodiments.

Referring now to FIG. 2, a flowchart illustrating a method of determining whether a scene lighting criteria has been met is shown, in accordance with some embodiments. As indicated in FIG. 2, this flowchart is a detailed view of one possible implementation of Step 115 from FIG. 1, i.e., the Step wherein image information is analyzed in order to make a determination if there is sufficient light in the surrounding environment of the local device, i.e., such that a scene lighting criteria has been met. In particular, at Step 200, the process may obtain ambient light sensor output. The ambient light sensor used by the device may comprise: a photo-resistor, a photo-diode, and photo transistor, or some combination thereof. Next, at Step 120a (i.e., one possible implementation of Step 120 from FIG. 1), the process may determine whether the obtained sensor output is greater than a threshold brightness value. If the measured sensor output is greater than the threshold value, the process may proceed to Step 130 of FIG. 1, i.e., to determining whether there are additional video frames to capture. If, instead, the measured sensor output is not greater than the threshold value, the process may proceed to Step 125 of FIG. 1, i.e., to attempt to increase brightness in the environment of the local device, e.g., according to one or more approaches described herein.

Figure 3:
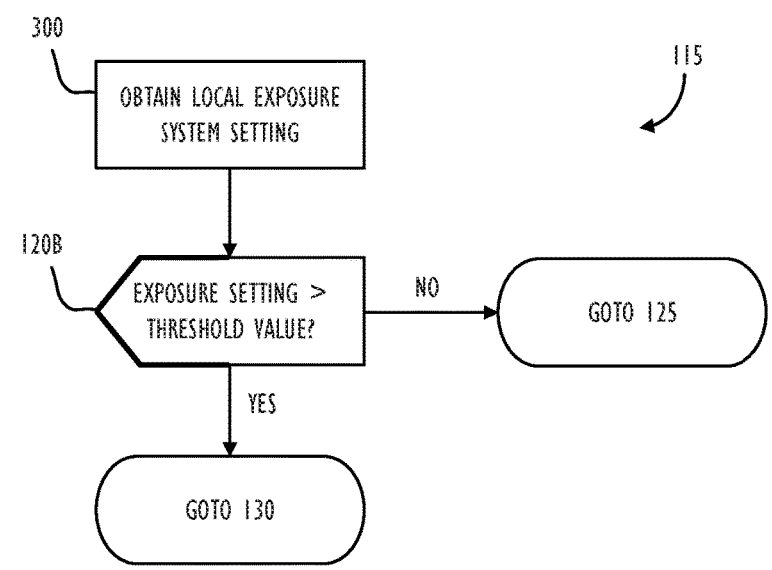
FIG. 3 is a flowchart illustrating a method of determining whether a scene lighting criteria has been met, in accordance with other embodiments.

Referring now to FIG. 3, a flowchart illustrating a method of determining whether a scene lighting criteria has been met is shown, in accordance with some embodiments. As indicated in FIG. 3, this flowchart is a detailed view of one possible implementation of Step 115 from FIG. 1, i.e., the Step wherein image information is analyzed in order to make a determination if a scene lighting criteria has been met. In particular, at Step 300, the process may obtain exposure system settings for the local device. The exposure system setting obtained by the device may comprise: a gain setting, an ISO setting, an aperture setting, and exposure time setting, an EV (i.e., "exposure value") setting, or some combination thereof. Next, at Step 120b (i.e., one possible implementation of Step 120 from FIG. 1), the process may determine whether the obtained exposure setting value is greater than a threshold value. If the exposure setting value is greater than the threshold value, the process may proceed to Step 130 of FIG. 1, i.e., to determining whether there are additional video frames to capture. If, instead, the exposure setting value is not greater than the threshold value, the process may proceed to Step 125 of FIG. 1, i.e., to attempt to increase brightness in the environment of the local device, e.g., according to one or more approaches described herein. (Note, the convention used in FIG. 3 is that an exposure setting value greater than the threshold value indicates an environment that is sufficiently bright, i.e., wherein the scene lighting criteria has been met. Of course, in other implementations, or if other exposure settings are used, it may be the case that an exposure setting value less than the threshold value is what indicates an environment that is bright enough to meet the scene lighting criteria, e.g., with an exposure setting parameter where smaller values indicate a brighter environment.)

Figure 4:
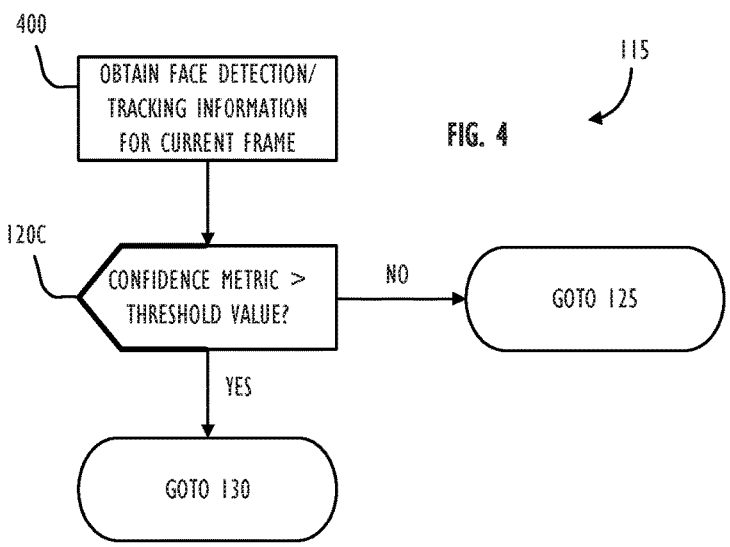
FIG. 4 is a flowchart illustrating a method of determining whether a scene lighting criteria has been met, in accordance with still other embodiments.

Referring now to FIG. 4, a flowchart illustrating a method of determining whether a scene lighting criteria has been met is shown, in accordance with some embodiments. As indicated in FIG. 4, this flowchart is a detailed view of one possible implementation of Step 115 from FIG. 1, i.e., the Step wherein image information is analyzed in order to make a determination if a scene lighting criteria has been met. In particular, at Step 400, the process may obtain face detection and/or face tracking information for the current video frame captured at the local device. The face detection and/or face tracking information obtained by the device may comprise the output of one or more face detection or face tracking algorithms, such as algorithms using face bounding box techniques, which may provide a confidence metric that reflects how likely it is that a face is present in a captured image. Face detection/face tracking may be used to help determine the brightness levels of the scene and/or to determine whether the brightness level of the scene is likely to be sufficiently bright enough to meet the scene lighting criteria. For example, when attempting to determine if a lighting criteria has been met for a particular scene, the brightness level of the pixels within a bounding box around a detected face may provide a relevant proxy for metering, i.e., determining the overall scene brightness level (e.g., in videoconferencing applications, wherein a face is likely to present in the scene at most times). However, in other situations, the face of the user may leave the captured scene (which would result in a low face confidence metric), but the user may no longer want or need to activate (or maintain) the low lighting mode, e.g., because there is no longer a face close to the display screen that could benefit from additional illumination. In such circumstances, a different scheme may be employed, e.g., wherein a low lighting mode is activated when a face detection/face tracking confidence metric is in a first range (e.g., 30%-50% confidence), but then deactivated if the confidence metric is greater than (or less than) the first range. Such a scheme may allow the device to turn off the low lighting mode in situations where the face was already detected with sufficient confidence such that additional lighting might not be needed to capture a satisfactory video stream, as well as situations where it is so unlikely that a face is present in the captured scene that additional lighting might be superfluous and/or consume unnecessary device battery life.

Next, at Step 120*c* (i.e., one possible implementation of Step 120 from FIG. 1), the process may determine whether the obtained face detection and/or face tracking information has a value that is greater than a threshold value (e.g., a face detection or face tracking confidence metric that is greater than a threshold face detection confidence value). If the face detection and/or face tracking confidence metric is greater than the threshold value, the process may proceed to Step 130 of FIG. 1, i.e., determining whether there are additional video frames to capture. If, instead, the face detection and/or face tracking confidence metric is not greater than the threshold value, the process may proceed to Step 125 of FIG. 1, i.e., to attempt to increase brightness in the environment of the local device e.g., according to one or more approaches described herein.

Because the presence or absence of a user's face in a given scene is not strictly related to the brightness level in the scene, according to some embodiments, the techniques of FIG. 4 may be used alone and/or in conjunction with the techniques of FIG. 2 and FIG. 3. For example, if the techniques of FIG. 2 and/or FIG. 3 indicate that the scene brightness level is just below the acceptable threshold, but the technique of FIG. 4 indicates that the user of the device's face is still being detected with a very large confidence metric (e.g., greater than 90% confidence), then the device may decide that it does not yet need to enter the low lighting conditions mode and attempt to increase local device brightness (i.e., the process may proceed to Step 130). Likewise, if the techniques of FIG. 2 and/or FIG. 3 indicate that the scene brightness level is just above the acceptable threshold, but the technique of FIG. 4 indicates that the user of the device's face is either not detected or detected with a very small confidence score (e.g., less than 10% confidence), then the device may decide that it does need to enter the low lighting conditions mode and attempt to increase local device brightness anyway (i.e., the process may proceed to Step 125). These are merely two examples of how the techniques of FIGS. 2, 3, and 4 may be combined in a given implementation to help the device decide whether or not the device is presently in low-lighting conditions that merit the device taking some action to attempt to increase the brightness in the device's surroundings.

In other embodiments, the techniques of FIG. 4 may be applied to the detection of objects of interest other than faces, e.g., if it was known that certain objects or classes of objects were likely or desired to be in the scene. For example, other objects could be detected within the scene using object detection algorithms, decision forests, neural networks, machine learning, or the like. The detection of objects may also be aided by other device sensors, such as depth and/or motion sensors. As with the detection of human faces, the presence (or absence) of the objects of interest in the scene may be indicative of the overall scene lighting conditions.

Figure 5:
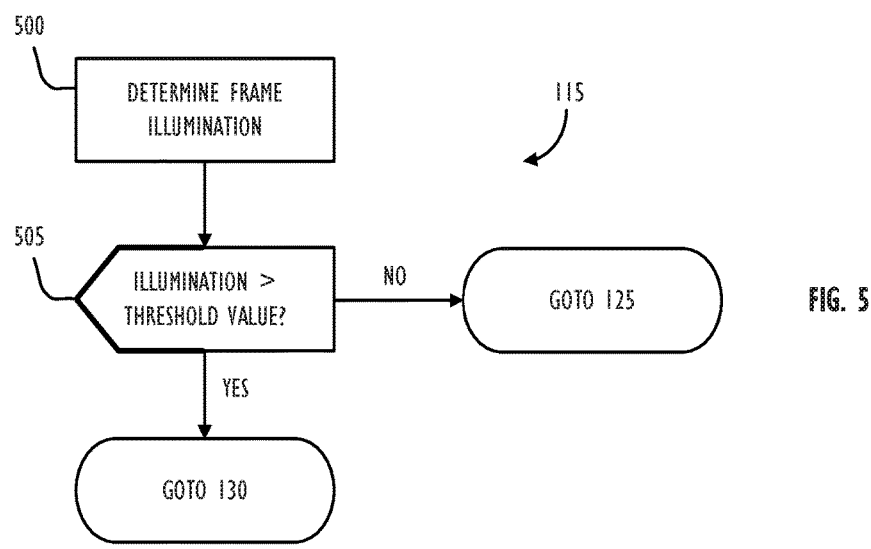
FIG. 5 is a flowchart illustrating a method of determining scene illumination in a videoconferencing scene, in accordance with some embodiments.

Referring now to FIG. 5, a flowchart illustrating a method of determining scene illumination in a scene being displayed on a device is shown, in accordance with some embodiments. As indicated in FIG. 5, this flowchart is a detailed view of one possible implementation of Step 115 from FIG. 1, i.e., the Step wherein image information is analyzed in order to make a determination if a scene lighting criteria has been met. In particular, at Step 500, the process may determine a frame illumination value. This determination may be made in a number of ways, depending on a given implementation. For example, a single image histogram may be created over the entire image frame (e.g., a luminance histogram recording the luminance values of all pixels in the current image frame). The average (or median) of such histogram may then be utilized as the frame illumination value. In another embodiment, a histogram may be created over only a portion of the image frame (e.g., over the location of a detected face, over the central portion of the image, or over a portion of the image indicated by a user, for example, via touching a portion of the display screen). In still other embodiments, multiple image histograms may be created over different areas of the current image frame and then combined in some fashion to determine an overall image frame illumination value. Finally, multiple types of histograms (e.g., histograms recording different image pixel properties, such a luminance, R, G, B, Cb, Cr, etc.) may be created and then combined in some fashion to determine an overall image frame illumination value.

In still other embodiments the determined illumination value may be calculated using some form of a moving average algorithm, e.g., calculating an average luminance of the N most recently obtained image frames. Some moving average algorithms may also exhibit some form of 'hysteresis,' that is change more slowly over time, due to the influence of the calculated frame illumination values for more recently captured video image frames. For example, the determined frame illumination value of the current image frame (using a hysteresis scheme) may be based: 70% on the illumination value of the current image, 20% on the illumination value of the immediately preceding image, and 10% on the illumination value of the image frame captured two frames ago in the past. Applying a moving average and/or hysteresis scheme to the frame illumination determination step may help the device from determining too quickly that a device is in low light conditions (e.g., if the light level has dropped only momentarily, e.g., someone flicking off and back on a light switch in a room), as well as stopping the device from too quickly determining that a device is no longer in low light conditions (e.g., if the light level has increased only momentarily, e.g., someone flicking on and then back off a light switch in a room). In other words, by looking back some number of historical captured image frames in the past before making its final determination as to lighting conditions, the device may reduce the number of false-positives (i.e., situations where the device determines it is in low-light conditions, but it is not really necessary to enter the low-lighting conditions modes described herein) and/or false-negatives (i.e., situations where the device determines it is not in low-light conditions, but it actually should activate one or more of the low-lighting conditions modes described herein to send video frames of sufficient quality).

Once the frame illumination value has been determined in the desired fashion, the process may proceed to Step 505, wherein the device may evaluate whether the illumination value is greater than a predetermined (or dynamic) threshold value. (In the case of a dynamic threshold, the threshold may change over time based on, e.g., a user preference or setting, the time of day, lighting condition trends in the recent past, device display screen size, device display screen maximum brightness levels, device display screen pixel count, etc.) If the answer to the query is "NO" at Step 505, then the device may proceed to attempt to increase local device brightness (i.e., the process may proceed to Step 125). If, instead, the answer to the query is "YES" at Step 505, then the device may proceed to Step 130.

Figure 6:
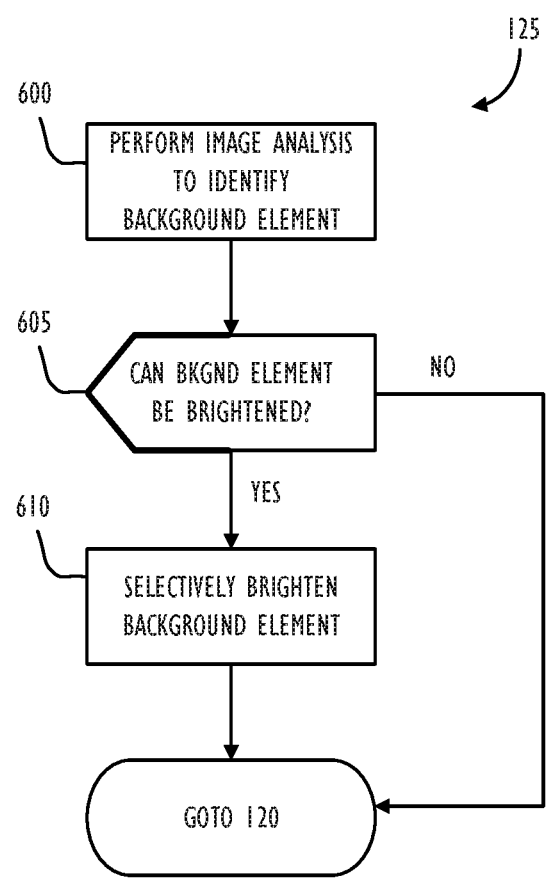
FIG. 6 is a flowchart illustrating a method of performing image analysis on background elements in a videoconferencing scene, in accordance with some embodiments.

Referring now to FIG. 6, a flowchart illustrating a method of performing image analysis to identify one or more background elements in a scene being displayed on a device is shown, in accordance with some embodiments. As indicated in FIG. 6, this flowchart is a detailed view of one possible implementation of Step 125 from FIG. 1, i.e., the Step wherein the device tries to increase the brightness in the surrounding environment of the local device. In particular, at Step 600, the process may perform image analysis to identify background element(s) in the displayed image. For example, an image analysis process may be performed that identifies background portions of the displayed image based on, e.g., depth sensing, motion sensing, color analysis, focus analysis, edge analysis, or some combination thereof, so that one or more identified background portions may be brightened. Once any background element(s) from the video frames being displayed on the device have been identified, the process may determine whether such background element(s) may be brightened (Step 605). According to some embodiments, this determination may entail a determination the identified background elements may be brightened without significantly affecting image quality on the device's display. For example, regions that are already white or some other bright color (e.g., walls in the background of a scene) may be good candidates for brightening that will not negatively affect the image quality on the device, e.g., because they will leave the pixels comprising a subject's face (or other object of interest) on the display screen unaltered and/or because the brightened pixels comprise large background portions of the image that do not possess many image features or details that are important to the main content of the video stream (i.e., the movement of a human subject's face and/or mouth).

If, at Step 605, it is determined that the background element(s) may be brightened, the process may proceed to Step 610 to selectively brighten the identified background element(s). According to some embodiments, this may entail increasing the luminance of pixels located in the identified background element(s) by a fixed or dynamic amount, e.g., according to a tone mapping curve. According to other embodiments, this may entail shifting an image histogram for the identified background portions of the image upwards toward greater luminance values. Once the identified background elements have been sufficiently brightened (or brightened to a maximum allowable limit), the process may proceed to Step 120 of FIG. 1, i.e., to again test whether or not a lighting criteria has been met for the environment of the local device. If, at Step 605, it is determined that the background element(s) may not be brightened (e.g., either because no such background element are identified or because they may not be brightened without negatively affecting image quality), the process may proceed to Step 120 of FIG. 1, i.e., to again test whether or not a lighting criteria has been met for the environment of the local device. If the answer to that query is still 'NO,' then the device may attempt one or more other methods of increasing the brightness in the environment of the local device that do not specifically involve brightening only background elements from the displayed image at the local device, as will be discussed in further detail below.

Figure 7:
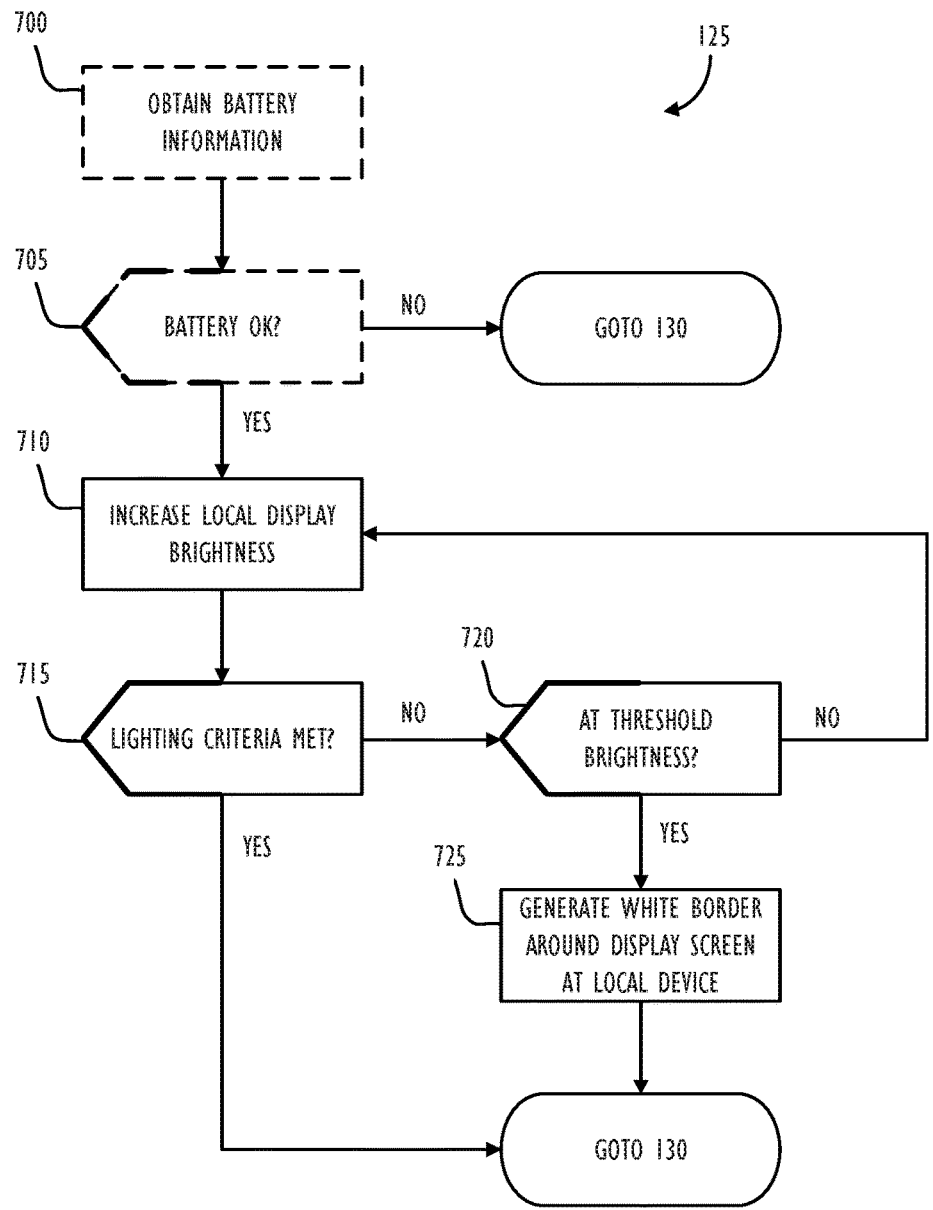
FIG. 7 is a flowchart illustrating a method of increasing illumination of a videoconferencing scene using the videoconferencing device, in accordance with some embodiments.

Referring now to FIG. 7, a flowchart illustrating a method of increasing illumination of a captured video scene using a personal electronic device is shown, in accordance with some embodiments. First, the method may optionally obtain battery information at Step 700. Next, it may determine if the remaining battery charge percentage is sufficient to proceed with the illumination increase process at Step 705, e.g., by determining whether the battery capacity is above a threshold level. (The dashed lines around boxes 700 and 705 in FIG. 7 indicate their optional nature in this exemplary method, though, of course, a consideration of battery information may be relevant to any of the low lighting condition techniques described herein.) In embodiments employing these steps, the system may set a threshold battery charge level, e.g., 10% battery capacity, below which the device will not employ any of the illumination increasing processes described herein, in an effort to conserve the remaining battery life. If the battery capacity is not above the threshold level at Step 705, the process may simply proceed to continue capturing video frames (i.e., the process may proceed to Step 130) unless or until there are no further video frames to obtain and/or the device conditions have changed (e.g., by being plugged in to a wall outlet or recharged above the threshold battery charge level) such that attempts to increase lighting levels in the environment of the local device may be tried again. If, instead, the battery capacity is above the threshold level at Step 705, the process may proceed to Step 710, where it again attempts to increase the brightness level in the environment surrounding the local display (e.g., by incrementally increasing the device's display screen brightness in one or more regions, such as in identified background elements of a displayed image). In other embodiments, the device's display screen brightness may be increased to its maximum value in a single step, rather than being increased incrementally. If, at Step 715 in FIG. 7, the lighting criteria is still not met, the process may proceed to Step 720 to determine whether the device screen display is already at a threshold brightness level (which threshold could, in some embodiments, be dependent on the remaining battery charge level). If the answer is "NO" at Step 720, the process may return to Step 710 to further incrementally increase the device's display screen brightness. If, instead, the answer is "YES" at Step 720, the process may proceed to Step 725 to generate a white (or other brightly-colored) border region(s), e.g., a border region(s) of adjustable thickness, around the display screen of the local device.

According to some embodiments, the "border region(s)" generated by Step 725 may also grow incrementally, e.g., growing incrementally in thickness, until it is determined that the lighting criteria has been met at Step 715. In some embodiments, there may be a "maximum" allowed thickness value for the white (or other brightly-colored) border region(s), so that a threshold amount of the video stream being received from the other recipient video conferee's device is still visible on the display screen of the local device. In some embodiments, the bright border region(s) may take up no more than 50% of the total pixels on the local device's display screen. In still other embodiments, the "border region(s)" generated by Step 725 may comprise patterns other than a border region around the outer edges of the device's display screen. For example, the white (or other brightly-colored) region may simply be added to the top half, bottom half, left side, or right side, etc. of the local device's display screen, with the rest of the video stream being received from the other recipient video conferee's device being compressed, condensed, or cropped to fit in the non-white region of the local device's display screen. In some embodiments, the portion of the local device's display screen that are turned to white (or some other bright color) may be intelligently chosen based on, e.g., the position of the user of the local device's face with respect to the device's display screen. For example, if the user is holding their device above their face, or depending on the angle of the device display screen with respect to the user's face, it may be more desirable to turn the lower half of the display screen into white pixels than the upper half, since pixels on the lower half of the display screen may have a greater chance of casting illumination onto the face of the user of the local device. These determinations may be aided by the aforementioned face detection and/or face tracking algorithms running on the device, as well as device positional sensors, such as accelerometers and/or gyrometers. As with the increase of the local device's display brightness at Step 710, the white (or other brightly-colored) border region(s) of Step 725 may be grown incrementally to determine when the scene lighting criteria is met, or may instead by set to their maximum values in the first instance to provide the greatest amount of light possible as soon as possible.

In cases wherein the display device comprises a desktop computer (e.g., with a monitor and connected webcam or other digital camera) or a tablet or other mobile device capable of opening multiple "windows" on a display screen simultaneously (e.g., a video capture preview/videoconferencing window and one or more other windows such as a web browser or other application), the local device brightness adjustments may be prioritized in different ways. In the example of creating a bright border region, when the video capture preview/videoconferencing window does not take up the entire display, the bright border region may be placed around the entire display screen's outer edge or around the edge of the video capture preview/videoconferencing window. Alternately, a first bright border region may be placed around the video capture preview/videoconferencing window, and a second bright border region may be placed around the display screen's outer edge.

If, at any point, it is determined at Step 715 that a scene lighting criteria has been met, the process may then proceed to continue obtaining video frames if there are more to obtain (i.e., the process may proceed to Step 130). In other embodiments, the generation of the white (or other brightly-colored) border region(s) of Step 725 may be done at the same time as (or even prior to) the increase of the local device's display brightness at Step 710.

FIG. 7 represents but one option of a scheme for increasing illumination of a captured video scene using a personal electronic device. In some embodiments, different types of adjustments may be done to sequentially increase the brightness in the environment of the device as more display brightness is called for. In some of these instances, the scheme may max out changes to one type of adjustment before moving to another type of adjustment. As an example, the system may start by globally increasing the brightness until a predetermined global brightness has been achieved, and (if more brightness is needed) then do a first local adjustment (e.g., by brightening identified background elements in the image being displayed on the device) until a predetermined brightness change has been reached, and then (again, if more brightness is needed) replace and brighten the content of particular portions of the device display (e.g., adding one or more bright border regions).

According to some embodiments, once a desired scene lighting criteria is met, one or more of the types of brightness adjustments applied may be decreased (or returned to their original status), so long as the overall scene lighting level continues to meet the scene lighting criteria. For example, if replacing and brightening the content of particular portions of the device display leads to the scene lighting criteria being met, local brightness adjustments that were previously made to the identified background elements may be scaled back down to their original brightness levels (or as close to their original brightness levels as possible while still meeting the scene lighting criteria).

Alternatively, the scheme may alternate between the types of adjustments utilized as more brightness is needed. As an example, the scheme may start by globally increasing the brightness to a first threshold, then engaging in a certain amount of local adjustments (until a corresponding threshold is reached), and then may resume globally increasing to a second threshold.

The decisions made by a given scheme may also be based, at least in part, on available power. For example, the decision of whether or not to enter into a low-lighting mode may be based on available power. Assuming a decision is made to entire into a low-lighting mode, the decision making criteria for which adjustments to use (and/or in which order to use them) may also be based on available power. As an example, if a device has above a certain threshold of available power (e.g., if the device is plugged in to an outlet or if an internal battery of the device has greater than a predetermined charge level), the low-lighting mode may begin by making a global display adjustment (e.g., brightening all the pixels on the device display at once). If the device does not have above the certain threshold of available power (e.g., if the device is unplugged and an internal battery of the device has less than the predetermined charge level), the low-light mode may instead start with a local adjustment (which may not produce as much additional light, but may consume less power). Similarly, the level of available power to a device may put a maximum limit on the amount of brightness adjustments that may be made (or attempted).

Figure 8:
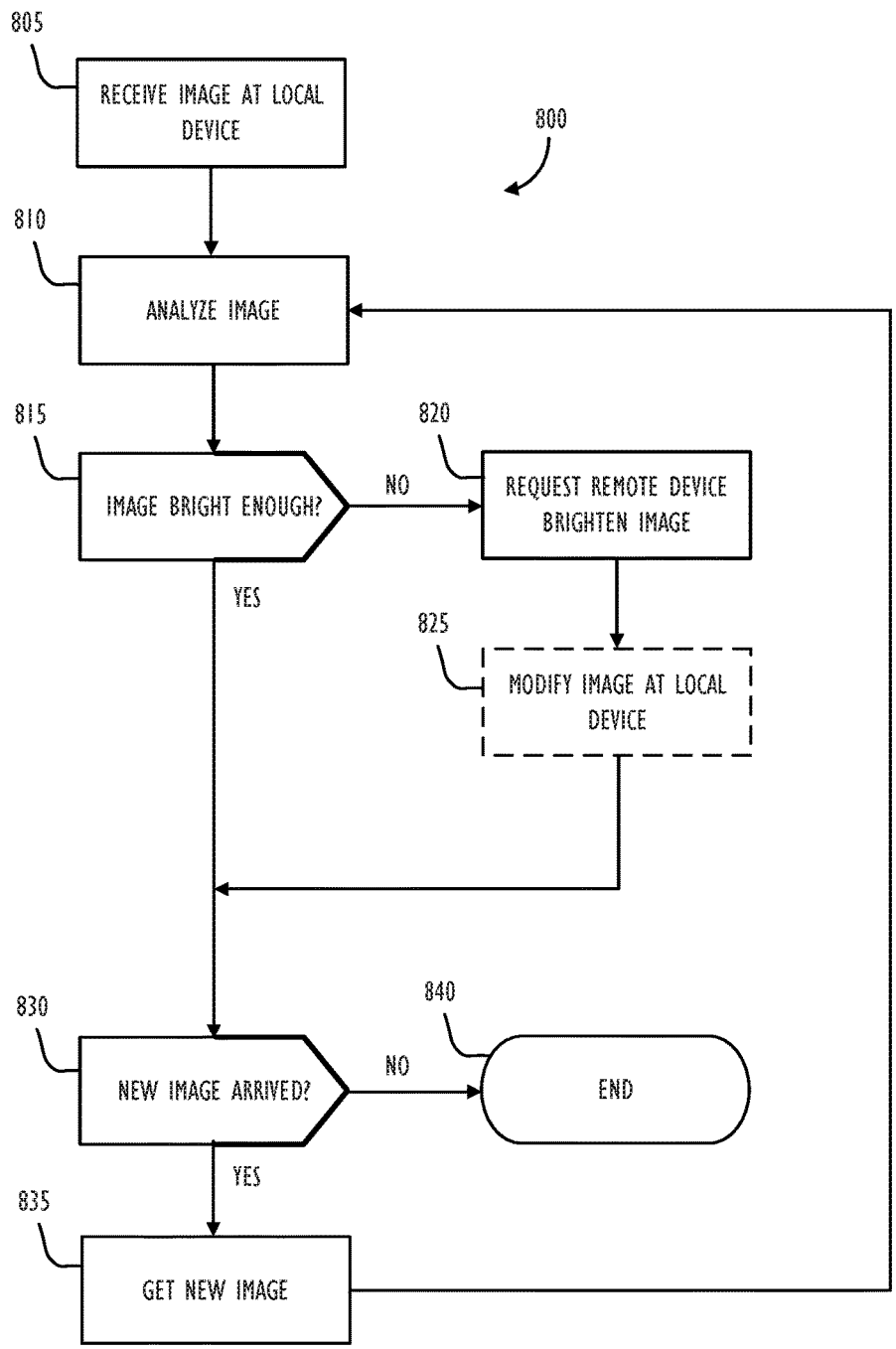
FIG. 8 is a flowchart illustrating a method of allowing a device to request an increase in the illumination of a captured video scene being transmitted to it, in accordance with some embodiments.

Referring now to FIG. 8, a flowchart 800 illustrating a method of allowing a device to request an increase in the illumination of a captured video scene being transmitted to it (e.g., during a videoconference) is shown, in accordance with some embodiments. First, at Step 805, the local device receives and displays an image from a remote device to display, e.g., to display within a video conferencing mode. Then, at Step 810, the local device may analyze the received image for brightness. If, at Step 815, it is determined that the received image is not bright enough, the process may proceed to Step 820, wherein the local device may send a request to the remote device to brighten the images that it is transmitting. The request sent to the remote mobile device may, e.g., take the form of a notification via a pop-up message box or other icon displayed on the display screen of the remote device to indicate that the local user would like the remote user to attempt to brighten the environment of the remote device. Alternately, in some embodiments, the remote device may automatically undertake efforts to brighten its environment in response to receiving the request from the local device. In still other embodiments, the local user may have the ability to manually send a request to the remote user to attempt to brighten the environment around the remote device, even if the images currently being analyzed meet the scene lighting criteria.

Upon receiving a request to brighten the images that it is transmitting, if it so desires and is able to, the remote device may then undertake one or more of the methods described herein (e.g., the methods detailed in conjunction with FIG. 6 or 7) to attempt to brighten its surrounding environment in response to the request received from the local device, e.g., by brightening its entire display screen, brightening selected background element(s) of its display screen, and/or adding a white (or other brightly-colored) region(s) on its display screen, so as to further illuminate the environment (which, e.g., may include the face of the user of the remote device or other object of interest that the user of the local device wishes to see). Optionally, at Step 825, in addition to the request sent to the remote device, the local device may attempt to modify the images that are being sent to it from the remote device, e.g., by undertaking image processing to brighten the images (e.g., histogram shifting, tone mapping, etc.) and/or increasing its own display screen's brightness level. With some source images, however, if they are obtained in an extremely low-light environment, then no amount of image processing or screen brightening at the local device alone may be able to present bright enough images to the local device user. If, at Step 815, it is determined that the received image is bright enough (or after the request has been made to the remote device to brighten its surroundings at Step 820, and optionally modified at the local device at Step 825), the process may proceed to Step 830 to see if there are further new images arriving. If a new image arrives ("YES" at Step 830), the process may obtain and display the new image at Step 835, and then return back to Step 810 to analyze the newly-received image to see if the local device needs to continue to request that the remote device attempt to increase the brightness in its surrounding environment. If no more new images arrive ("NO" at Step 830), the process may complete (Step 840).

FIGS. 9-11 illustrate exemplary techniques by which mobile personal electronic devices may implement a low lighting conditions mode during video capture operations and, in particular, videoconferencing operations, in accordance with some embodiments. Turning first to FIGS. 9A and 9B, global adjustment techniques are illustrated. In FIG. 9A, device 900 represents the "local" video conferencing device. As shown, device 900 may comprise: one or more front-facing video cameras 905 (i.e., a video camera facing in the same direction as the device display screen), one or more ambient light sensors 910, and a display screen 915. Display screen 915 may comprise an LCD, LED, OLED, AMOLED, or other types of display screen having pixels (or other display elements) that the device 900 is capable of individually controlling the brightness and/or color of. In some embodiments, each pixel on display screen 915 may have a maximum brightness level that it is capable of outputting light at, as well as a maximum range of colors (i.e., a gamut) over which it is capable of producing visible light. The display screen may present a number of user-interface (UI) elements to a user of the device, such as buttons 945*a-c*. In this example, button 945*a* represents a button that may be used by a user of the device to initiate or terminate a "low lighting conditions" mode, as has been described above. Button 945*b* represents a button that may be used by a user of the device to terminate the videoconferencing mode, and button 945*c* represents a button that may be used by a user of the device to mute the audio stream of the videoconference. Of course, in other implementations, it may be possible to have many other UI elements, e.g., volume buttons, buttons to control which camera of the device is being utilized to capture video images for the video conference video stream by the local device, and/or sliders to indicate what degree of "low lighting conditions" assistance is to be applied by the local device. In other words, the buttons shown in FIGS. 9A and 9B are only exemplary in nature.

As shown in FIG. 9A, the display 915 of device 900 may comprise a smaller video window 920 that displays a live video stream of the user 935 of the local device, i.e., device 900, and his surroundings 940. Such a video feed 920 may be used so that user may keep himself 935 (or whatever scene he is attempting to transmit to the remote user) centered in the middle of the video feed, as well as to provide real-time feedback as to the relative darkness/brightness of the images being captured by the camera 910 (or a rear-facing camera(s), i.e., one or more cameras facing in the opposite direction as the device display screen, if they are being used) of his device 900. As also shown in FIG. 9A, the majority of the display 915 of device 900 may be encompassed by the live video stream showing the video conferee at the remote device (955) and his surroundings (960).

In the example shown in FIGS. 9A and 9B, the surroundings 940 of the user of the local device 900 have been deemed to not meet the lighting criteria (e.g., according Step 120 of FIG. 1). Thus, in this example, a low lighting conditions mode has been activated, as indicated by the dashed line circle around element 945*a*. In some embodiments, the low lighting conditions mode may turn on automatically when the user manually activates element 945*a*, e.g., by tapping on it on the display screen. In other embodiments, the low lighting conditions mode may turn on automatically when the local device determines that its surroundings are not sufficiently bright, e.g., if the lighting criteria has not been met over a threshold number of frames. In other embodiments, the device may provide an indication to the user that the recipient video conferee may benefit by turning on the low lighting conditions mode at the local device. In still other embodiments, a 'hybrid' manual/automatic low lighting conditions mode activation scheme may be employed, e.g., wherein the low lighting conditions mode activation button 945*a* only automatically appears as a part of the user interface in certain lighting conditions (e.g., below a threshold brightness level) but still needs to be manually activated, or wherein the low lighting conditions mode will only actually activate under certain automatically measured lighting conditions, regardless of whether the user has manually attempted to activate the button 945*a*.

As shown in FIG. 9A, in this example, the local device 900 attempts to increase the amount of illumination being cast on the face of the user 935 of the local device by increasing the overall screen brightness of the local device's display screen. This is indicated by the shaded region covering the entirety of display 915 of device 900. As indicated in FIG. 9B, this increased brightness in the display screen of the local device should result in brighter images being transmitted over communications link 965 to remote device 950. As mentioned above, the increase in local screen brightness may be implemented in a single step to increase the local device's screen brightness to its maximum value in one movement, or the local screen brightness may be gradually incremented as part of a feedback loop until the video images being captured by the local device again meet the lighting criteria.

Remote device 950 may be running an identical video-conferencing application to that running on device 900, including smaller video window 970 that displays a live video feed of the user 955 of the remote device, i.e., device 950, and his surroundings 960. In this example, the surroundings 960 of the remote user 955 are deemed sufficiently bright (e.g., because the captured images at the remote device 950 have met the lighting criteria over some threshold number of frames), such that the low lighting conditions mode in the remote device 950 has not been activated either automatically, manually, or otherwise (as indicated by the lack of a dashed line circle around button 945*a* on the display screen of remote device 950).

Referring now to FIGS. 10A and 10B, exemplary mobile video conferencing devices utilizing a low lighting conditions mode implementing local adjustment techniques that do not alter display content are illustrated, in accordance with other embodiments. In this example, rather than increasing the overall screen brightness of the local device

1000's display screen in a global fashion (as was shown in the example of FIGS. 9A and 9B), device 1000 in FIG. 10A has attempted to increase the illumination in its environment by identifying particular background element(s) 1005 in the video images being displayed on its display screen 915. This is indicated by the shaded regions 1005 covering various portions of display 915 of device 1000. As indicated in FIG. 10B, this increased brightness in the display screen of the device 1000 should result in brighter images being transmitted over communications link 965 to remote device 1050. As mentioned above, the increase in local screen brightness in the identified background element(s) may be implemented in a single step to increase the local device's screen brightness to its maximum value in one movement, or the local screen brightness may be gradually incremented as part of a feedback loop until the video images being captured by the local device again meet the scene lighting criteria. Instead of (or in addition to) brightening background elements that will not have a negative impact on the quality of the video conferee's face (or other objects of interest) in the video stream, the user of local device 1000 (user 935) may alternately indicate particular portion(s) of the display screen for brightening (e.g., via touch input) to increase the amount of illumination in his environment. This mechanism could serve as an override, e.g., in the event that the device is not able to locate any background elements for brightening and/or the elements located by the device for brightening lead to an undesirable reduction in image quality (e.g., washing out a portion of the image that the user is interested in seeing detail in).

Referring now to FIGS. 11A and 11B, exemplary mobile personal electronic devices utilizing a low lighting conditions mode implementing local adjustment techniques that alter display content are illustrated, in accordance with still other embodiments. In this example, rather than increasing the overall screen brightness of the local device 1100's display screen (as was shown in the example of FIGS. 9A and 9B) or increasing the brightness of particular background elements (as was shown in the example of FIGS. 10A and 10B), device 1100 in FIG. 11A has attempted to increase the illumination in its environment by adding a white (or other brightly-colored) border region 1105 to the video images being displayed on its display screen 915. This is indicated by the shaded region 1105 covering the outer border of display 915 of device 1100. As indicated in FIG. 11B, this increased brightness in the display screen of the local device should result in brighter images being transmitted over communications link 965 to remote device 1150. As mentioned above, the increase in local screen brightness may be implemented in a single step to increase the local device's screen brightness to its maximum value in one movement, or the local screen brightness may be gradually incremented as part of a feedback loop until the video images being captured by the local device again meet the scene lighting criteria. In some embodiments, this gradual process of incrementing may comprise increasing the thickness 1110 of border region 1105 from a minimum thickness up to a maximum thickness (or whenever the scene lighting criteria has been met at the local device). As mentioned above, this region 1105 could take on different shapes (e.g., the top half of pixels, left half of pixels, every other pixel in a given row, every other row of pixels, etc.) and/or sizes than the border region shown in FIG. 11A, and the pixels in the region(s) could be set to bright white, some other color, or a combination of colors (e.g., if there is still a desire to give the user some indication of the video content that is 'below' the bright border region(s)). As also mentioned above, some implementations may define a maximum bright border/bright region size, e.g., by defining a maximum thickness (or other regional dimension), or by defining a maximum number of pixels in the overall image that may be part of the bright border region(s) (e.g., a maximum of 50% of the pixels in the video image may be set to bright white). In some embodiments, in conjunction with one or more of the above-mentioned increased illumination approaches, the device may also indicate to the user of the device to move his or her face closer to the display screen of the device (such that the additional illumination cast from the display screen of the device may have a greater impact on the brightness of the user of the device's face) or farther from the display screen of the device (such that more pixels may be dedicated to the bright border/bright regions after the face takes up less of the display screen). As mentioned above, in response to one or more border regions being added to the display screen, the video image content being displayed may either be compressed or condensed (i.e., to fit into the remaining portion of the display screen not covered by the generated border regions), or the video image content being displayed may be cropped (i.e., by simply discarding the portions of the image that would be covered by the generated border regions).

Referring now to FIGS. 11C and 11D, exemplary mobile personal electronic devices utilizing a low lighting conditions mode implementing multiple local adjustment techniques concurrently are illustrated, in accordance with still other embodiments. In this example, rather than increasing the overall screen brightness of the local device 1100's display screen (as was shown in the example of FIGS. 9A and 9B) or increasing only the brightness of particular background elements (as was shown in the example of FIGS. 10A and 10B), or only adding a white (or other brightly-colored) border region to the video images being displayed on its display screen (as was shown in the example of FIGS. 11A and 11B), device 1160 in FIG. 11C has attempted to increase the illumination in its environment by increasing the brightness of particular identified background elements 1115 (e.g., to a maximum permitted extent), and then additionally by adding a white (or other brightly-colored) border region 1105 to the video images being displayed on its display screen 915. This is indicated by the shaded region 1105 covering the outer border of display 915 of device 1160 and the shaded regions 1115 covering remaining regions on the display 915 of device 1160 that have been identified as background elements.

As indicated in FIG. 11D, this increased brightness in the display screen of the local device should result in brighter images being transmitted over communications link 965 to remote device 1170. As mentioned above, the increase in local screen brightness in the identified background element(s) may be implemented in a single step to increase the local device's screen brightness to its maximum permitted extent in one movement, or the local screen brightness may be gradually incremented as part of a feedback loop until the video images being captured by the local device again meet the scene lighting criteria. In some embodiments, once the identified background elements have been brightened to the maximum permitted extent, the device may proceed to generate border region 1105 and then gradually increment the thickness 1110 of border region 1105 from a minimum thickness up to a maximum thickness (or whenever the scene lighting criteria has been met at the local device). As mentioned above, should the use of region 1105 lead to the scene lighting criteria being met, the brightness levels of one or more of the identified background elements could then gradually be scaled back down to their original levels (or to the lowest levels at which the scene lighting criteria continues to be met). In some embodiments, the hierarchy of scene illumination techniques may be different, e.g., beginning first by adding a bright border region (or other-shaped region) to the device's display, and then proceeding to brighten identified background elements if the brightening of the border region is not sufficient to meet the scene lighting criteria. In other embodiments, one or more scene illumination techniques may also be applied concurrently with one another, either as a single approach to increasing scene illumination or as part of a hierarchical system of scene illumination technique application.

Figure 12:
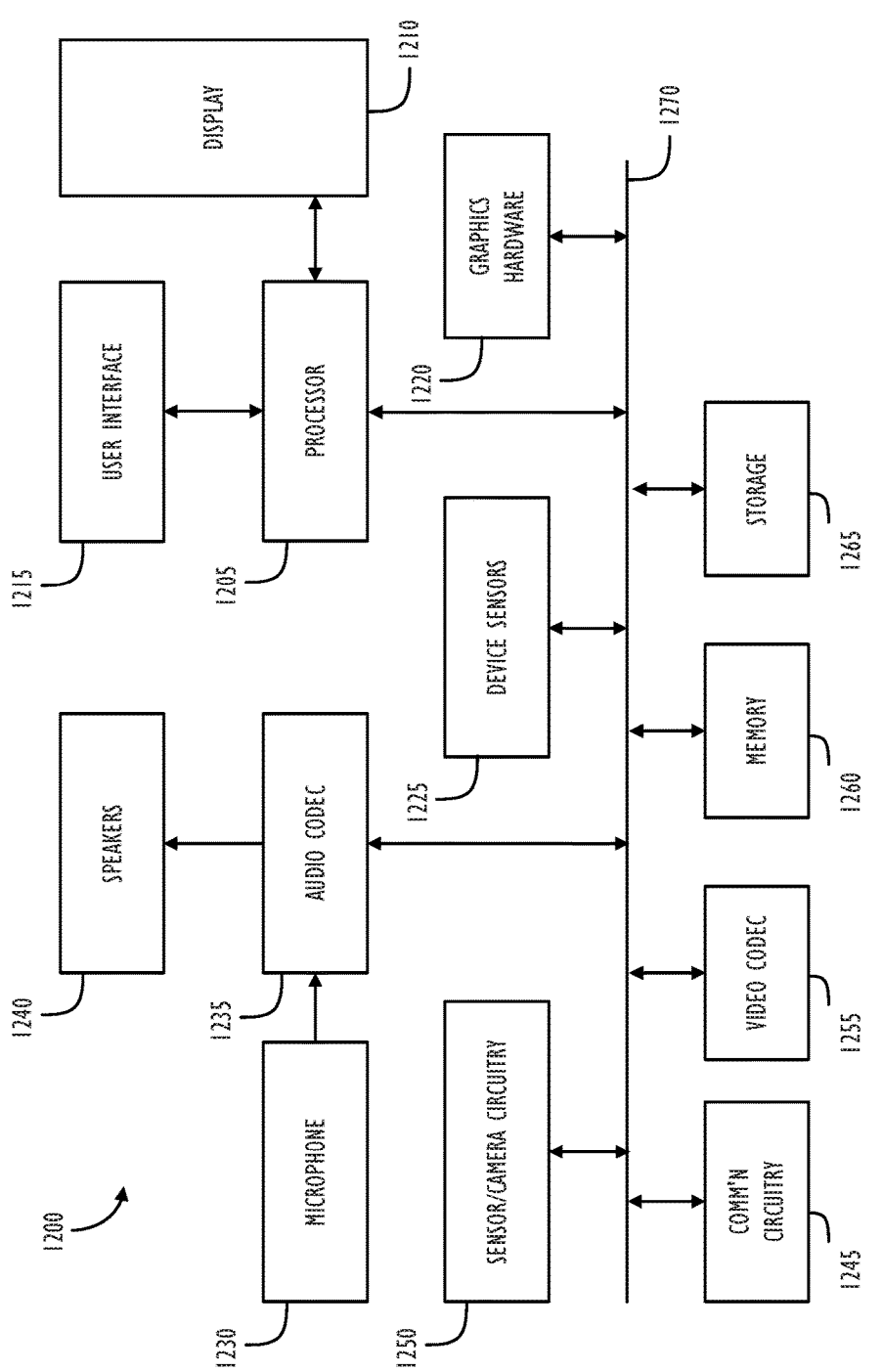
FIG. 12 illustrates a simplified functional block diagram of an illustrative electronic device, according to one embodiment.

FIG. 12 is a simplified functional block diagram of an illustrative electronic device, according to one embodiment. Electronic device 1200 may include processor 1205, display 1210, user interface 1215, graphics hardware 1220, device sensors 1225 (e.g., proximity sensor/ambient light sensor, depth sensors, infrared (IR) cameras, accelerometers and/or gyroscopes), microphone 1230, audio codec(s) 1235, speaker(s) 1240, communications circuitry 1245, digital image capture unit 1250, video codec(s) 1255, memory 1260, storage 1265, and communications bus 1270. Electronic device 1200 may be, for example, a personal digital assistant (PDA), personal music player, a mobile telephone, or a notebook, laptop or tablet computer system.

Processor 1205 may execute instructions necessary to carry out or control the operation of many functions performed by device 1200. Processor 1205 may, for instance, drive display 1210 and receive user input from user interface 1215. User interface 1215 can take a variety of forms, such as a button, keypad, dial, a click wheel, keyboard, display screen and/or a touch screen. Processor 1205 may be a system-on-chip such as those found in mobile devices and include a dedicated graphics processing unit (GPU). Processor 1205 may be based on reduced instruction-set computer (RISC) or complex instruction-set computer (CISC) architectures or any other suitable architecture and may include one or more processing cores. Graphics hardware 1220 may be special purpose computational hardware for processing graphics and/or assisting processor 1205 process graphics information. In one embodiment, graphics hardware 1220 may include a programmable graphics processing unit (GPU).

Sensor and camera circuitry 1250 may capture still and video images that may be processed to generate images in accordance with this disclosure. In some embodiments, sensor and camera circuitry 1250 may comprise a plurality of cameras, e.g., stereoscopic cameras, which may be used to create a scene depth map and/or identify background portions of a captured scene. The scene depth map and/or identified background portions may be processed to identify candidate background elements for brightening, e.g., in accordance with the techniques described above with reference to FIGS. 10A and 10B. Output from camera circuitry 1250 may further be processed, at least in part, by video codec(s) 1255 and/or processor 1205 and/or graphics hardware 1220, and/or a dedicated image processing unit incorporated within circuitry 1250. Images so captured may be stored in memory 1260 and/or storage 1265. Memory 1260 may include one or more different types of media used by processor 1205, graphics hardware 1220, and image capture circuitry 1250 to perform device functions. For example, memory 1260 may include memory cache, read-only memory (ROM), and/or random access memory (RAM). Storage 1265 may store media (e.g., audio, image and video files), computer program instructions or software, prefer-ence information, device profile information, and any other suitable data. Storage 1265 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 1260 and storage 1265 may be used to retain computer program instructions or code organized into one or more modules and written in any desired computer programming language. When executed by, for example, processor 1205 such computer program code may implement one or more of the methods described herein.

It is to be understood that the above description is intended to be illustrative, and not restrictive. The material has been presented to enable any person skilled in the art to make and use the invention as claimed and is provided in the context of particular embodiments, variations of which will be readily apparent to those skilled in the art (e.g., some of the disclosed embodiments may be used in combination with each other). In addition, it will be understood that some of the operations identified herein may be performed in different orders. The scope of the invention therefore should be determined with reference to the appended claims, along with the full scope of equivalents to which such claims are entitled.

The invention claimed is:

1. A non-transitory program storage device, readable by a programmable control device and comprising instructions stored thereon which, when executed, cause one or more processing units to:
    obtain a first frame from a first sequence of frames captured by a local device, the local device having a display;
    determine based, at least in part, on an analysis of the first frame that a first lighting criteria has not been met, wherein the instructions to determine that the first lighting criteria has not been met further comprise instructions to:
        identify a face confidence metric of the first frame; and
        determine the face confidence metric is indicative of a scene that does not meet the first lighting criteria;
    brighten the local device's display in response to determining that the first lighting criteria has not been met, wherein the instructions to brighten further comprise instructions to:
        analyze one or more images displayed on the local device's display;
        identify background regions in the one or more images displayed on the local device's display based on the analyzing; and
        brighten the identified background regions;
    obtain a second frame from the first sequence of frames;
    transmit the second frame from the local device to a remote device; and
    display, on the local device's display, one or more frames from a second sequence of frames received from the remote device coincidentally to the execution of the instructions to obtain, determine, or brighten.

2. The non-transitory program storage device of claim 1, wherein the instructions further comprise instructions to:
    obtain one or more subsequent frames from the first sequence of frames; and
    continue to brighten the local device's display in response to determining that the first lighting criteria has not been met for the one or more subsequent frames.

3. The non-transitory program storage device of claim 1, wherein the instructions to determine that the first lighting criteria has not been met further comprise instructions to:
receive output from an ambient light sensor of the local device; and
determine the ambient light sensor output indicative of a scene that does not meet the first lighting criteria.

4. The non-transitory program storage device of claim 1, wherein the instructions to brighten further comprise instructions to:
brighten all pixels on the local device's display by at least a first predetermined amount.

5. The non-transitory program storage device of claim 1, wherein the instructions to determine that the first lighting criteria has not been met further comprise instructions to:
analyze one or more additional frames from the first sequence of frames; and
determine, based on the analysis of the first frame and the one or more additional frames, that the first lighting criteria has not been met.

6. A non-transitory program storage device, readable by a programmable control device and comprising instructions stored thereon which, when executed, cause one or more processing units to:
obtain a first frame from a first sequence of frames captured by a local device, the local device having a display;
determine based, at least in part, on an analysis of the first frame that a first lighting criteria has not been met;
brighten the local device's display in response to determining that the first lighting criteria has not been met, wherein the instructions to brighten further comprise instructions to:
analyze one or more images displayed on the local device's display;
identify background regions in the one or more images displayed on the local device's display based on the analyzing;
brighten the identified background regions;
determine, after the brightening of the identified background regions to a first threshold amount, that the first lighting criteria has not been met;
generate one or more regions for a second frame from the first sequence of frames, wherein the one or more regions comprise one or more pixels with a first predetermined brightness value; and
display, on the local device's display, the second frame comprising the one or more generated regions.

7. The non-transitory program storage device of claim 6, wherein the instructions to generate one or more regions for a second frame from the first sequence of frames further comprise instructions to:
reduce the size of the second frame from the first sequence of frames; and
generate a border region around the second frame after its size is reduced, wherein the border region comprises one or more pixels with the first predetermined brightness value.

8. An electronic device comprising:
one or more cameras;
a display screen;
one or more ambient light sensors;
a battery;
a memory; and
at least one processor operatively coupled to the memory and the one or more cameras, wherein the at least one processor is programmed to execute instructions that cause the at least one processor to:
obtain a first frame from a first sequence of frames captured by the one or more cameras;
determine based, at least in part, on an analysis of the first frame that a first lighting criteria has not been met;
brighten the display screen in response to determining that the first lighting criteria has not been met, wherein the instructions to brighten further comprise instructions to:
analyze one or more images displayed on the display screen;
identify background regions in the one or more images displayed on the display screen based on the analyzing;
brighten the identified background regions;
determine, after the brightening of the identified background regions to a first threshold amount, that the first lighting criteria has not been met;
generate one or more regions for a second frame from the first sequence of frames, wherein the one or more regions comprise one or more pixels with a first predetermined brightness value; and
display, on the display screen, the second frame comprising the one or more generated regions;
obtain a second frame from the first sequence of frames;
transmit the second frame to a remote device; and
display, on the display screen, one or more frames from a second sequence of frames received from the remote device coincidentally to the execution of the instructions to obtain, determine, or brighten.

9. The electronic device of claim 8, wherein the instructions further comprise instructions to:
obtain one or more subsequent frames from the first sequence of frames; and
continue to brighten the display screen in response to determining that the first lighting criteria has not been met for the one or more subsequent frames.

10. The electronic device of claim 8, wherein at least one of the one or more generated regions comprises a region of adjustable size.

11. The electronic device of claim 8, wherein the instructions to determine the first lighting criteria has not been met further comprise instructions to:
receive output from at least one of the one or more ambient light sensors; and
determine the output from the at least one ambient light sensor is indicative of a scene that does not meet the first lighting criteria.

12. The electronic device of claim 8, wherein the instructions to brighten further comprise instructions to:
determine that the battery has above a threshold charge level remaining.

13. The electronic device of claim 8, wherein at least one of the one or more cameras is used to create a scene depth map, and wherein the scene depth map is utilized to identify the background regions.

14. The electronic device of claim 8, wherein the instructions to determine the first lighting criteria has not been met further comprise instructions to:
analyze one or more additional frames from the first sequence of frames; and
determine, based on the analysis of the first frame and the one or more additional frames, that the first lighting criteria has not been met.

15. The electronic device of claim 8, wherein the instructions to determine the first lighting criteria has not been met further comprise instructions to:
- identify a face confidence metric of the first frame; and
- determine the face confidence metric is indicative of a scene that does not meet the first lighting criteria.

16. A method, to brighten a presentation of one or more parties during a video conferencing session, comprising:
- obtaining, at a local device having a display, a first frame from a first sequence of frames captured by a remote device having a display;
- determining, at the local device, that the first frame captured by the remote device does not meet a first lighting criteria;
- sending, from the local device to the remote device, a message indicating the first frame does not meet the first lighting criteria and requesting that the remote device brighten its display in one or more identified background regions;
- displaying the first frame from the first sequence of frames in a first portion of the display of the local device;
- obtaining, at the local device and in response to the message, a second frame from the first sequence of frames, wherein the remote device has brightened the one or more identified background regions of its display and one or more additional regions of its display, wherein the one or more additional regions comprise one or more pixels with a first predetermined brightness value, and wherein the second frame from the first sequence of frames meets the first lighting criteria;
- displaying the second frame from the first sequence of frames in the first portion of the local device's display; and
- displaying, at the local device, a first frame from a second sequence of frames captured by the local device in a second portion of the local device's display,
- wherein the first frame from the second sequence of frames captured by local device is displayed at the local device concurrently with the displaying of the second frame from the first sequence of frames in the first portion of the local device's display.

17. The method of claim 16, wherein determining, at the local device, that the first frame captured by the remote device does not meet a first lighting criteria further comprises:
- identifying a face confidence metric of the first frame; and
- determining the face confidence metric is indicative of a scene that does not meet the first lighting criteria.

* * * * *